United States Patent
Fang

(10) Patent No.: US 12,389,113 B2
(45) Date of Patent: Aug. 12, 2025

(54) SWITCHING METHOD AND SWITCHING DEVICE FOR A DAY AND NIGHT FILTER SWITCHER

(71) Applicant: Luxshare Precision Technology (Nanjing) Co., LTD, Nanjing (CN)

(72) Inventor: Zhendong Fang, Nanjing (CN)

(73) Assignee: Luxshare Precision Technology (Nanjing) Co., LTD, Nanjing (CN)

( * ) Notice: Subject to any disclaimer, the term of this patent is extended or adjusted under 35 U.S.C. 154(b) by 104 days.

(21) Appl. No.: 18/209,073

(22) Filed: Jun. 13, 2023

(65) Prior Publication Data

US 2024/0147060 A1  May 2, 2024

(30) Foreign Application Priority Data

Oct. 27, 2022 (CN) .......................... 202211327956.3

(51) Int. Cl.
*H04N 23/667* (2023.01)
*H04N 23/11* (2023.01)
(Continued)

(52) U.S. Cl.
CPC .......... *H04N 23/667* (2023.01); *H04N 23/11* (2023.01); *H04N 23/71* (2023.01); *H04N 23/73* (2023.01)

(58) Field of Classification Search
CPC ...... H04N 23/667; H04N 23/11; H04N 23/71; H04N 23/73; H04N 23/60; H04N 23/70
See application file for complete search history.

(56) References Cited

U.S. PATENT DOCUMENTS

| 9,813,624 B2 * | 11/2017 | Kawasaki | H04N 23/60 |
| 10,313,589 B2 * | 6/2019 | Chino | G02B 7/006 |
| 2021/0297573 A1 * | 9/2021 | Utagawa | H04N 23/90 |

FOREIGN PATENT DOCUMENTS

| CN | 103945201 A | 7/2014 |
| CN | 103945201 B | 4/2016 |

(Continued)

OTHER PUBLICATIONS

Japanese Office Action for Japanese Application No. 2023-089365, dated Jun. 25, 2024, with English translation.

(Continued)

*Primary Examiner* — Ahmed A Berhan
(74) *Attorney, Agent, or Firm* — Birch, Stewart, Kolasch & Birch, LLP

(57) ABSTRACT

A switching method includes: determining a mean brightness value of pixels in an image and a maximum brightness value of the pixels in the image; determining a brightness threshold according to the maximum brightness value in the image; determining a proportion of an area where a brightness value of each pixel in the image is greater than or equal to the brightness threshold to the image to be a bright area proportion of the image; determining a mean brightness threshold and a mean brightness threshold range for the image according to the bright area proportion of the image; counting the number of consecutive image frames where the mean brightness value of the image is within the mean brightness threshold range; and in the case where the number of image frames is greater than or equal to a frame number threshold, switching a first working mode to a second working mode.

16 Claims, 4 Drawing Sheets

(51) Int. Cl.
*H04N 23/71* (2023.01)
*H04N 23/73* (2023.01)

(56) References Cited

FOREIGN PATENT DOCUMENTS

| | | |
|---|---|---|
| CN | 107026967 A | 8/2017 |
| CN | 106231179 B | 5/2019 |
| CN | 114885096 A | 8/2022 |
| JP | 2008-131530 A | 6/2008 |
| JP | 2016-25573 A | 2/2016 |
| JP | 2016-86391 A | 5/2016 |
| JP | 2016-86392 A | 5/2016 |
| JP | 2021-148984 A | 9/2021 |
| KR | 10-1381580 B1 | 4/2014 |
| KR | 10-2016-0113795 A | 10/2016 |

OTHER PUBLICATIONS

Chinese Office Action and Search Report for Chinese Application No. 202211327956.3, dated Jan. 27, 2025, with English translation.

\* cited by examiner

SWITCHING METHOD AND SWITCHING DEVICE FOR A DAY AND NIGHT FILTER SWITCHER

CROSS-REFERENCE TO RELATED APPLICATION(S)

This application claims priority to Chinese Patent Application No. 202211327956.3 filed Oct. 27, 2022, the disclosure of which is incorporated herein by reference in its entirety.

TECHNICAL FIELD

The present disclosure relates to the technical field of image processing and, in particular, to a day and night filter switcher, a switching method therefor, and a switching device therefor.

BACKGROUND

With the development and advancement of science and technology, 24/7 monitoring is required in many scenarios at present. With enough light and sufficient brightness, it also needs to be ensured by day that the colors of an image are accurately and truly restored as much as possible. However, due to insufficient illuminance at night in the environment, a night mode needs to be enabled, an infrared (IR) lamp is turned on, and an IR filter is switched to so that the brightness of an image is improved without causing light interference to the environment. Therefore, the targeted switching between day and night modes is particularly important.

At present, methods for cameras to switch between day and night modes mainly include a hardware switching scheme and a software switching scheme. The hardware switching scheme is mainly to add a photosensitive sensor sensitive to visible light, where upper and lower brightness thresholds are preset for brightness in a visible light environment such that a day mode and a night mode are switched through the photosensitive sensor. In this manner, the determination for automatic day and night switching will not be interfered by infrared light and the problem of repeated day and night switching can be solved. The software switching scheme is to determine the brightness of a current frame image by software. In the software switching scheme, two image brightness thresholds for switching need to be set, where one threshold is used for switching a day mode to a night mode so as to switch to the IR filter, and the other threshold is used for switching the night mode to the day mode. The two brightness thresholds are adjusted to deal with the problem of repeated day and night switching.

However, the hardware switching scheme has high requirements on the structural design of the cameras and requires a relatively high camera hardware cost. The software switching scheme solves the problem of repeated switching between the day and night modes by simply adjusting switching thresholds. In a scene with relatively strong infrared light or high dynamics, if the night mode is switched to, image brightness is easy to exceed an upper limit, so as to switch to the day mode, and then insufficient image brightness due to insufficient visible light causes the switching to the night mode. Such repetitions cause instable images, the noise caused by the switching between filters affects the quality of life, and such products have greatly degraded quality.

Therefore, how to improve the switching accuracy of a day and night filter switcher of a camera is an urgent problem to be solved.

SUMMARY

The present disclosure provides a day and night filter switcher, a switching method therefor, and a switching device therefor, which can improve the switching accuracy of the day and night filter switcher in a camera.

According to one aspect of the present disclosure, a switching method for a day and night filter switcher is provided. The method includes the steps described below.

In a first working mode, based on brightness of pixels in an image captured by a camera, a mean brightness value Mean Luma of the pixels in the image and a maximum brightness value $Y_{max}$ of the pixels in the image are determined.

A brightness threshold $Y\_thresh$ for the image is determined according to the maximum brightness value $Y_{max}$ in the image, where the brightness threshold $Y\_thresh = Y_{max} \times Y\_Percent$, and $0 < Y\_Percent < 1$.

A proportion of an area where a brightness value of each pixel in the image is greater than or equal to the brightness threshold $Y\_thresh$ to the image determined to be a bright area proportion bright_tone_percent of the image.

A mean brightness threshold and a mean brightness threshold range for the image are determined according to the bright area proportion bright_tone_percent of the image, where the mean brightness threshold is negatively correlated to the bright area proportion bright_tone_percent of the image.

The number of consecutive image frames where the mean brightness value of the image is within the mean brightness threshold range is counted.

It is determined whether the number of image frames is greater than or equal to a frame number threshold.

In the case where the number of image frames is greater than or equal to the frame number threshold, the first working mode is switched to a second working mode.

In the case where the first working mode is a day mode, the second working mode is a night mode and the mean brightness threshold range is being less than or equal to the mean brightness threshold; and in the case where the first working mode is the night mode, the second working mode is the day mode and the mean brightness threshold range is being greater than or equal to the mean brightness threshold.

Optionally, in the case where the first working mode is the day mode, the mean brightness threshold is a first mean brightness threshold Day2Night_Mean_Luma_thresh; and in the case where the first working mode is the night mode, the mean brightness threshold is a second mean brightness threshold Night2Day_Mean_Luma_thresh.

The first mean brightness threshold Day2Night_Mean_Luma_thresh is Day2Night_Mean_Luma_thresh=Day2Night_Final_Mean_Luma_thresh×(1−bright_tone_percent), where Day2Night_Final_Mean_Luma_thresh is a first preset mean brightness value.

The second mean brightness threshold Night2Day_Mean_Luma_thresh is Night2Day_Mean_Luma_thresh=Night2Day_Final_Mean_Luma_thresh×(1−bright_tone_percent), where Night2Day_Final_Mean_Luma_thresh is a second preset mean brightness value.

Optionally, the first mean brightness threshold Day2Night_Mean_Luma_thresh is smaller than the second mean brightness threshold Night2Day_Mean_Luma_thresh.

Optionally, before the number of consecutive image frames where the mean brightness value Mean Luma of the image is within the mean brightness threshold range is counted, the method further includes the steps described below.

A gain total_gain and an exposure time shut_time of the camera are acquired and an exposure value EV of the camera is determined.

An exposure threshold and an exposure threshold range for the image are determined according to the bright area proportion bright_tone_percent of the image, where the exposure threshold is positively correlated to the bright area proportion bright_tone_percent of the image.

The step in which the number of consecutive image frames where the mean brightness value Mean Luma of the image is within the mean brightness threshold range is counted includes the step described below.

The number of the consecutive image frames where the mean brightness value Mean Luma of the image is within the mean brightness threshold range and the exposure value EV of the image is within the exposure threshold range is counted.

In the case where the first working mode is the day mode, the exposure threshold range is being greater than or equal to the exposure threshold; and in the case where the first working mode is the night mode, the exposure threshold range is being less than or equal to the exposure threshold.

Optionally, in the case where the first working mode is the day mode, the exposure threshold is a first exposure threshold Day2Night_Final_EV_thresh; and in the case where the first working mode is the night mode, the exposure threshold is a second exposure threshold Night2Day_Final_EV_thresh.

The first exposure threshold Day2Night_Final_EV_thresh is Day2Night_Final_EV_thresh=Day2Night_EV_thresh×(1+bright_tone_percent), where Day2Night_EV_thresh is a first preset exposure value.

The second exposure threshold Night2Day_Final_EV_thresh is Night2Day_Final_EV_thresh=Night2Day_EV_thresh×(1+bright_tone_percent), where Night2Day_EV_thresh is a second preset exposure value.

Optionally, the first exposure threshold Day2Night_Final_EV_thresh is greater than the second exposure threshold Night2Day_Final_EV_thresh.

Optionally, before the number of the consecutive image frames where the mean brightness value Mean Luma of the image is within the mean brightness threshold range and the exposure value EV of the image is within the exposure threshold range is counted, the method further includes the steps described below.

A white balance gain value of the image in a current environment and a white balance threshold and a white balance threshold range for the image are acquired.

The step in which the number of the consecutive image frames where the mean brightness value Mean Luma of the image is within the mean brightness threshold range and the exposure value EV of the image is within the exposure threshold range is counted includes the step described below.

The number of the consecutive image frames where the mean brightness value Mean Luma of the image is within the mean brightness threshold range, the exposure value EV of the image is within the exposure threshold range, and the white balance gain value of the image is within the white balance threshold range is counted.

In the case where the first working mode is the day mode, the white balance threshold range is being less than or equal to the white balance threshold; and in the case where the first working mode is the night mode, the white balance threshold range is being greater than or equal to the white balance threshold.

Optionally, the step of acquiring the white balance threshold includes the steps described below.

A white balance gain value in an invisible light environment is acquired.

The white balance gain value in the invisible light environment is converted into floating-point coordinates (x0, y0) in a two-dimensional space of a white balance algorithm.

The white balance threshold R0 is determined according to the floating-point coordinates (x0, y0), where the white balance threshold $R0=(x-x0)^2+(y-y0)^2$.

Optionally, in the case where the first working mode is the day mode, the step in which the first working mode is switched to the second working mode includes the step described below.

A working state of the camera is switched from the day mode to the night mode, an IR filter is switched to, and an IR lamp is turned on.

In the case where the first working mode is the night mode, the step in which the first working mode is switched to the second working mode includes the step described below.

The working state of the camera is switched from the night mode to the day mode, an all-pass filter is switched to, and the IR lamp is turned off.

According to another aspect of the present disclosure, a switching device for a day and night filter switcher is provided. The device includes a brightness acquisition module, a brightness threshold determination module, a bright area proportion determination module, a mean brightness threshold determination module, an image frame number counting module, and a frame number determination module.

The brightness acquisition module is configured to determine, in a first working mode and based on brightness of pixels in an image captured by a camera, a mean brightness value Mean Luma of the pixels in the image and a maximum brightness value Ymax of the pixels in the image.

The brightness threshold determination module is configured to determine a brightness threshold Y_thresh for the image according to the maximum brightness value Ymax in the image, where the brightness threshold Y_thresh=Ymax× Y_Percent, and 0<Y_Percent<1.

The bright area proportion determination module is configured to determine a proportion of an area where a brightness value of each pixel in the image is greater than or equal to the brightness threshold Y_thresh to the image to be a bright area proportion bright_tone_percent of the image.

The mean brightness threshold determination module is configured to determine a mean brightness threshold and a mean brightness threshold range for the image according to the bright area proportion bright_tone_percent of the image, where the mean brightness threshold is negatively correlated to the bright area proportion bright_tone_percent of the image.

The image frame number counting module is configured to count the number of the consecutive image frames where the mean brightness value Mean Luma of the image is within the mean brightness threshold range.

The frame number determination module is configured to determine whether the number of image frames is greater than or equal to a frame number threshold and, in the case where the number of image frames is greater than or equal to the frame number threshold, switch the first working mode to a second working mode.

In the case where the first working mode is a day mode, the second working mode is a night mode and the mean brightness threshold range is being less than or equal to the mean brightness threshold; and in the case where the first working mode is the night mode, the second working mode is the day mode and the mean brightness threshold range is being greater than or equal to the mean brightness threshold.

According to another aspect of the present disclosure, a day and night filter switcher is provided. The day and night filter switcher includes the switching device for the day and night filter switcher according to any one of embodiments of the present disclosure, where the switching device is configured to perform the switching method for the day and night filter switcher according to any one of embodiments of the present disclosure.

According to the technical solutions in the embodiments of the present disclosure, the mean brightness threshold and the mean brightness threshold range for the image are determined according to the bright area proportion bright_tone_percent of the image so that in a dynamic scene, a basic condition for switching the working mode can be adjusted according to the bright area proportion bright_tone_percent of the image of the current environment, and it is determined whether the image continuously satisfies the basic condition for switching the working mode so that frequent switches due to changes in image brightness can be avoided, the working mode can be prevented from being switched inaccurately, and the switching accuracy and reliability of the day and night filter switcher can be improved; and the size of the mean brightness threshold may be adjusted through Y_Percent, the difficulty in switching the working mode is changed, and controllability is improved so that the switching method for the day and night filter switcher is applicable to different scenes, improving applicability.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate technical solutions in embodiments of the present disclosure more clearly, the drawings used in the description of the embodiments are described below. Apparently, the drawings described below illustrate part of embodiments of the present disclosure, and those skilled in the art may obtain other drawings based on the drawings described below on the premise that no creative work is done.

DETAILED DESCRIPTION

Technical solutions in embodiments of the present disclosure are described clearly and completely in conjunction with the drawings in the embodiments of the present disclosure from which the solutions are apparent to those skilled in the art. Apparently, the embodiments described below are part, not all, of embodiments of the present disclosure. Based on the embodiments described herein, all other embodiments obtained by those of ordinary skill in the art on the premise that no creative work is done are within the scope of the present disclosure.

It is to be noted that the terms such as "first" and "second" in the description, claims, and above drawings of the present disclosure are used to distinguish between similar objects and are not necessarily used to describe a particular order or sequence. It is to be understood that data used in this manner are interchangeable where appropriate so that embodiments of the present disclosure described herein may also be implemented in a sequence not illustrated or described herein. In addition, the terms "including", "having", and any other variations thereof are intended to encompass a non-exclusive inclusion. For example, a process, method, system, product, or device that includes a series of steps or units not only includes the expressly listed steps or units but may also include other steps or units that are not expressly listed or are inherent to such process, method, system, product, or device.

Embodiment One

Figure 1:
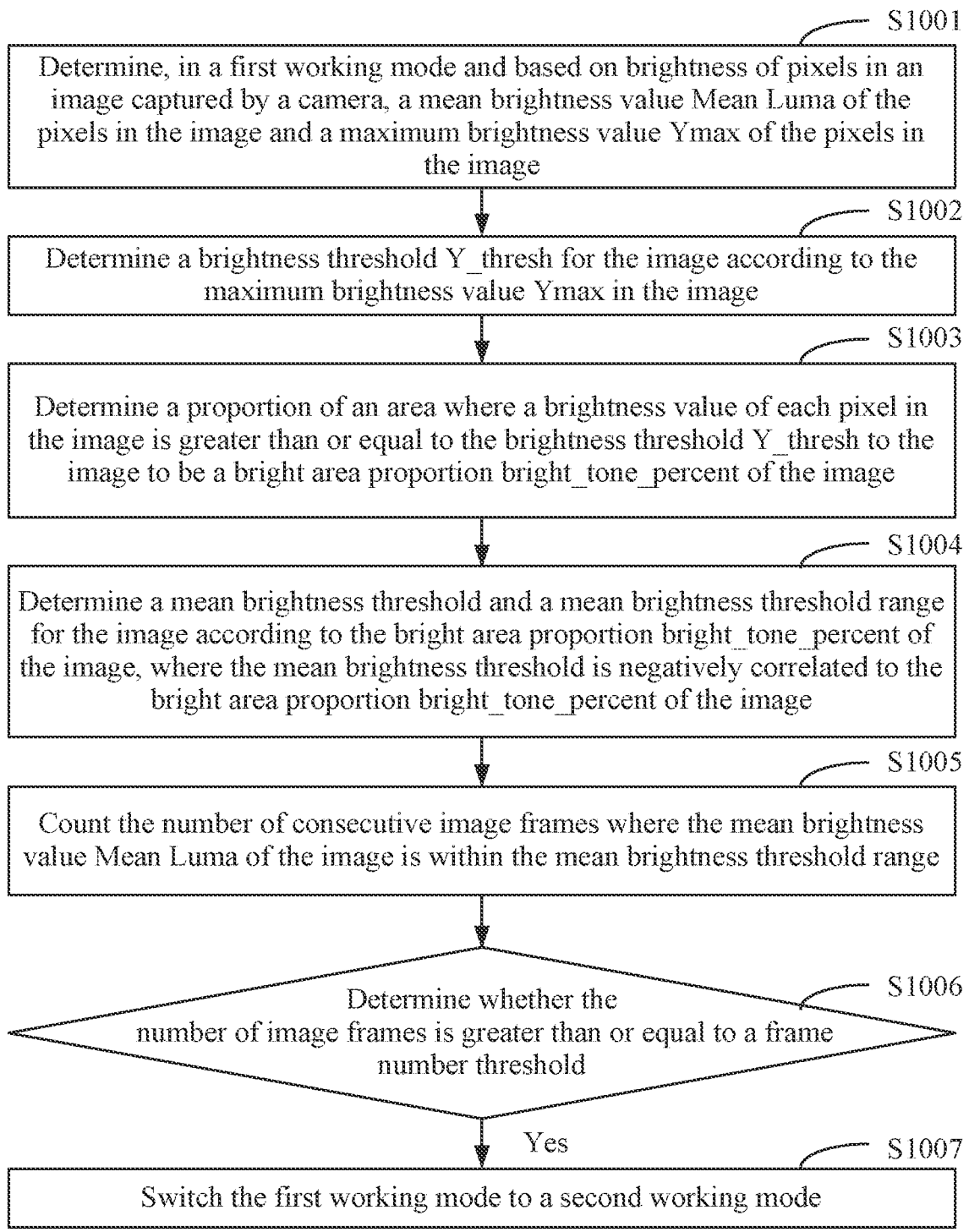
FIG. 1 is a flowchart of a switching method for a day and night filter switcher according to embodiment one of the present disclosure.

FIG. 1 is a flowchart of a switching method for a day and night filter switcher according to embodiment one of the present disclosure. This embodiment is applicable to the case where a surveillance camera for 24/7 monitoring needs to switch between day and night filters. The method may be performed by a switching device for the day and night filter switcher. The switching device may be implemented by hardware and/or software and may be configured in the day and night filter switcher. As shown in FIG. 1, the method includes the steps described below.

In S1001, in a first working mode, based on brightness of pixels in an image captured by a camera, a mean brightness value Mean Luma of the pixels in the image and a maximum brightness value Ymax of the pixels in the image are determined.

The first working mode refers to a working mode of the day and night filter switcher and may be a day mode or a night mode. All images herein refer to images of a current environment captured by the camera.

In S1002, a brightness threshold Y_thresh for the image is determined according to the maximum brightness value Ymax in the image.

The brightness threshold Y_thresh=Ymax×Y_Percent, 0<Y_Percent<1, and Y_Percent may be set according to actual requirements.

In S1003, a proportion of an area where a brightness value of each pixel in the image is greater than or equal to the brightness threshold Y_thresh to the image is determined to be a bright area proportion bright_tone_percent of the image.

For example, the higher bright area proportion bright_tone_percent of the image indicates that an area with relatively high brightness occupies a higher proportion in the image, more areas in the current environment have strong light, and the current environment is more likely to be by day; and the lower bright area proportion bright_tone_percent of the image indicates that the area with relatively high brightness occupies a lower proportion in the image, fewer areas in the current environment have strong light, and the current environment is more likely to be at night.

In S1004, a mean brightness threshold and a mean brightness threshold range for the image are determined according to the bright area proportion bright_tone_percent of the image, where the mean brightness threshold is negatively correlated to the bright area proportion bright_tone_percent of the image.

In the case where the first working mode is the day mode, the mean brightness threshold range is being less than or equal to the mean brightness threshold; and in the case where the first working mode is the night mode, the mean brightness threshold range is being greater than or equal to the mean brightness threshold.

In S1005, the number of consecutive image frames where the mean brightness value Mean Luma of the image is within the mean brightness threshold range is counted.

For example, in the case where the first working mode is the day mode, the number of the consecutive image frames where the mean brightness value Mean Luma of the image is less than or equal to the mean brightness threshold is counted; and in the case where the first mode is the night mode, the number of the consecutive image frames where the mean brightness value Mean Luma of the image is greater than or equal to the mean brightness threshold is counted.

In S1006, it is determined whether the number of the consecutive image frames is greater than or equal to a frame number threshold. In the case where the number of the consecutive image frames is greater than or equal to the frame number threshold, S1007 is performed.

The frame number threshold may be set according to actual situations.

In S1007, the first working mode is switched to a second working mode.

The second working mode also refers to a working mode of the day and night filter switcher and is different from the first working mode. In the case where the first working mode is the day mode, the second working mode is the night mode. Alternatively, in the case where the first working mode is the night mode, the second working mode is the day mode.

For example, in the day mode, when the mean brightness value Mean Luma of the image is less than or equal to the mean brightness threshold, that is, the mean brightness value Mean Luma of the image is within the mean brightness threshold range, it indicates that the current environment is relatively dark. When the number of the consecutive image frames where the mean brightness value Mean Luma of the image of the current environment captured by the camera is within the mean brightness threshold range is greater than or equal to the frame number threshold, it indicates that the environment is relatively dark continuously, the working mode of the day and night filter switcher may be switched from the day mode to the night mode, a working state of the camera may be switched from the day mode to the night mode, an IR filter is switched to, and an IR lamp is turned on.

In the night mode, when the mean brightness value Mean Luma of the image is greater than or equal to the mean brightness threshold, that is, the mean brightness value Mean Luma of the image is within the mean brightness threshold range, it indicates that the current environment is relatively bright. When the number of the consecutive image frames where the mean brightness value Mean Luma of the image of the current environment captured by the camera is within the mean brightness threshold range is greater than or equal to the frame number threshold, it indicates that the environment is relatively bright continuously, the working mode of the day and night filter switcher may be switched from the night mode to the day mode, the working state of the camera may be switched from the night mode to the day mode, an all-pass filter is switched to, and the IR lamp is turned off.

That the mean brightness value Mean Luma of the image is within the mean brightness threshold range is just a basic condition for switching the working mode. On the premise that the image of the current environment captured by the camera satisfies the basic condition, the number of image frames where the image continuously satisfies the basic condition needs to be greater than or equal to the frame number threshold. When the number of image frames where the image of the current environment captured by the camera continuously satisfies the basic condition is less than the frame number threshold, it indicates that the mean brightness value Mean Luma of the image fails to be continuously within the mean brightness threshold range, and the case where the image of the current environment captured by the camera satisfies the basic condition may occur since a light source changes for a short time, for example, the sun is blocked by dark clouds by day or a high-power illumination lamp appears at night. In this case, the working state should not be switched.

The mean brightness threshold and the mean brightness threshold range are related to the bright area proportion bright_tone_percent of the image and also related to the brightness threshold Y_thresh=Ymax×Y_Percent and Y_Percent. The higher bright area proportion bright_tone_percent of the image indicates that the current environment has higher brightness and it is easier to be in the day mode. In this case, the mean brightness threshold is relatively small, the mean brightness threshold range in the day mode is reduced, the day mode is difficult to switch to the night mode, the mean brightness threshold range in the night mode is increased, and the night mode is easy to switch to the day mode. The lower bright area proportion bright_tone_percent of the image indicates that the current environment has lower brightness and it is easier to be in the night mode. In this case, the mean brightness threshold is relatively large, the mean brightness threshold range in the day mode is increased, the day mode is easy to switch to the night mode, the mean brightness threshold range in the night mode is reduced, and the night mode is difficult to switch to the day mode.

The size of the mean brightness threshold may also be adjusted through Y_Percent, so as to change the difficulty in switching the working mode. For example, when Y_Percent is set to be relatively small, for example, 70%, the bright area proportion bright_tone_percent of the same image may be increased, the mean brightness threshold is decreased, the mean brightness threshold range in the day mode is reduced, and the mean brightness threshold range in the night mode is increased so that the working mode is easy to be the night mode. When Y_Percent is set to be relatively large, for example, 90%, the bright area proportion bright_tone_percent of the same image may be decreased, the mean brightness threshold is increased, the mean brightness threshold range in the day mode is increased, and the mean brightness threshold range in the night mode is reduced so that the working mode is easy to be the day mode.

In the embodiment of the present disclosure, the mean brightness threshold and the mean brightness threshold range for the image are determined according to the bright area proportion bright_tone_percent of the image so that in a dynamic scene, the basic condition for switching the working mode can be adjusted according to the bright area proportion bright_tone_percent of the image of the current environment, and it is determined whether the image continuously satisfies the basic condition for switching the working mode so that frequent switches due to changes in image brightness can be avoided, the working mode can be prevented from being switched inaccurately, and the switching accuracy and reliability of the day and night filter switcher can be improved; and the size of the mean brightness threshold may be adjusted through Y_Percent, the difficulty in switching the working mode is changed, and controllability is improved so that the switching method for the day and night filter switcher is applicable to different scenes, improving applicability.

Optionally, in the case where the first working mode is the day mode, the mean brightness threshold is a first mean brightness threshold Day2Night_Mean_Luma_thresh; and in the case where the first working mode is the night mode, the mean brightness threshold is a second mean brightness threshold Night2Day_Mean_Luma_thresh.

The first mean brightness threshold Day2Night_Mean_Luma_thresh is Day2Night_Mean_Luma_thresh=Day2Night_Final_Mean_Luma_thresh×(1−bright_tone_percent), where Day2Night_Final_Mean_Luma_thresh is a first preset mean brightness value.

The second mean brightness threshold Night2Day_Mean_Luma_thresh is Night2Day_Mean_Luma_thresh=Night2Day_Final_Mean_Luma_thresh×(1−bright_tone_percent), where Night2Day_Final_Mean_Luma_thresh is a second preset mean brightness value.

Specifically, the first mean brightness threshold Day2Night_Mean_Luma_thresh and the second mean brightness threshold Night2Day_Mean_Luma_thresh are both negatively correlated to the bright area proportion bright_tone_percent of the image and decrease as the bright area proportion bright_tone_percent of the image increases.

For example, in the case where the first mode is the day mode, the mean brightness threshold range is being less than or equal to the first mean brightness threshold Day2Night_Mean_Luma_thresh. An increase of the bright area proportion bright_tone_percent of the image results in a decrease of the first mean brightness threshold Day2Night_Mean_Luma_thresh, the mean brightness threshold range is reduced, and the day mode is difficult to switch to the night mode; and in the case where the first mode is the night mode, the mean brightness threshold range is being greater than or equal to the second mean brightness threshold Night2Day_Mean_Luma_thresh. An increase of the bright area proportion bright_tone_percent of the image results in a decrease of the second mean brightness threshold Night2Day_Mean_Luma_thresh, the mean brightness threshold range is increased, and the night mode is easy to switch to the day mode. The first preset mean brightness value Day2Night_Final_Mean_Luma_thresh and the second preset mean brightness value Night2Day_Final_Mean_Luma_thresh may be set according to actual requirements, and the size relationship between the two values is not limited in the embodiment of the present disclosure.

Thus, the mean brightness threshold range in the case where the first working mode is the day mode and the mean brightness threshold range in the case where the first working mode is the night mode can have multiple possibilities, for example, overlap or do not overlap, through the first mean brightness threshold Day2Night_Mean_Luma_thresh and the second mean brightness threshold Night2Day_Mean_Luma_thresh so that controllability and applicability can be improved.

In an optional embodiment, the first mean brightness threshold Day2Night_Mean_Luma_thresh is smaller than the second mean brightness threshold Night2Day_Mean_Luma_thresh.

For example, in the day mode, the basic condition for switching the working mode is satisfied until the mean brightness value Mean Luma of the image decreases to be less than or equal to the first mean brightness threshold Day2Night_Mean_Luma_thresh. The first mean brightness threshold Day2Night_Mean_Luma_thresh is relatively small so that the image satisfies the basic condition relatively late in the day mode and the day mode may be switched to the night mode later. In the night mode, the basic condition for switching the working mode is satisfied until the mean brightness value Mean Luma of the image increases to be greater than or equal to the second mean brightness threshold Night2Day_Mean_Luma_thresh. The second mean brightness threshold Night2Day_Mean_Luma_thresh is relatively large so that the image satisfies the basic condition relatively late in the night mode and the night mode may be switched to the day mode later. In this manner, the first working mode may be switched to the second working mode later so that frequent switches are avoided, which can decrease a switching frequency, reduce energy consumption, and save energy.

Embodiment Two

Figure 2:
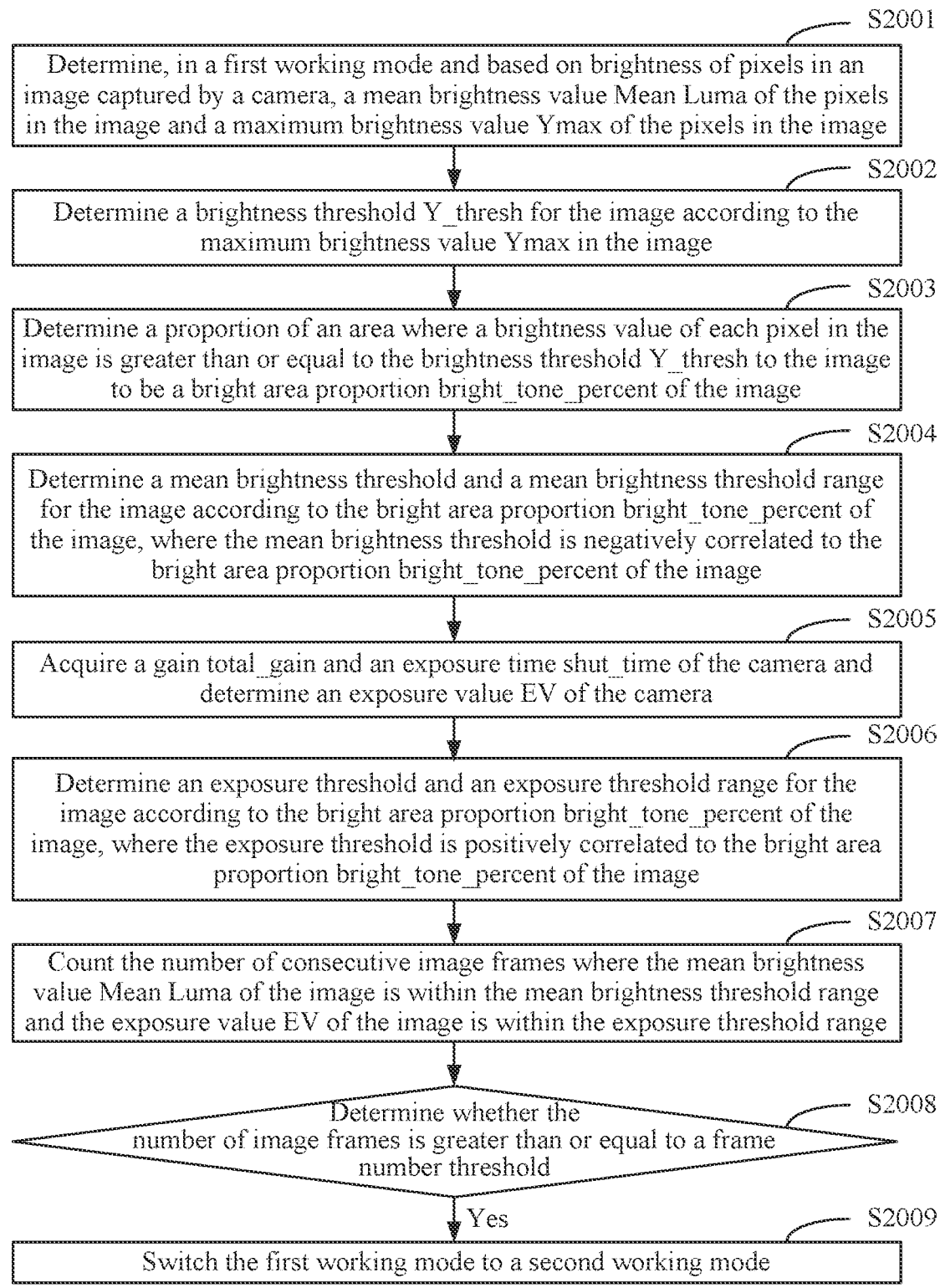
FIG. 2 is a flowchart of a switching method for a day and night filter switcher according to embodiment two of the present disclosure.

FIG. 2 is a flowchart of a switching method for a day and night filter switcher according to embodiment two of the present disclosure. Compared with the preceding embodiment, this embodiment adds a basic condition for switching a working mode: an exposure value EV of an image is within an exposure threshold range. As shown in FIG. 2, the method includes the steps described below.

In S2001, in a first working mode, based on brightness of pixels in an image captured by a camera, a mean brightness value Mean Luma of the pixels in the image and a maximum brightness value Ymax of the pixels in the image are determined.

In S2002, a brightness threshold Y_thresh for the image is determined according to the maximum brightness value Ymax in the image.

In S2003, a proportion of an area where a brightness value of each pixel in the image is greater than or equal to the brightness threshold Y_thresh to the image is determined to be a bright area proportion bright_tone_percent of the image.

In S2004, a mean brightness threshold and a mean brightness threshold range for the image are determined according to the bright area proportion bright_tone_percent of the image, where the mean brightness threshold is negatively correlated to the bright area proportion bright_tone_percent of the image.

In S2005, a gain total_gain and an exposure time shut_time of the camera are acquired and an exposure value EV of the camera is determined.

The exposure value EV of the camera refers to an amplification gain for amplifying an analog signal to make the image visible or to enable the image to better restore original colors of an actual environment, and the exposure value EV of the camera is EV=total_gain×shut_time.

In S2006, an exposure threshold and an exposure threshold range for the image are determined according to the bright area proportion bright_tone_percent of the image, where the exposure threshold is positively correlated to the bright area proportion bright_tone_percent of the image.

In the case where the first working mode is a day mode, the exposure threshold range is being greater than or equal to the exposure threshold; and in the case where the first working mode is a night mode, the exposure threshold range is being less than or equal to the exposure threshold.

In S2007, the number of consecutive image frames where the mean brightness value Mean Luma of the image is within the mean brightness threshold range and the exposure value EV of the image is within the exposure threshold range is counted.

In S2008, it is determined whether the number of image frames is greater than or equal to a frame number threshold. In the case where the number of image frames is greater than or equal to the frame number threshold, S2009 is performed.

In S2009, the first working mode is switched to a second working mode.

For example, the basic condition for switching the working mode further includes that the exposure value EV of the image is within the exposure threshold range. In the day mode, when the exposure value EV of the image is greater than or equal to the exposure threshold, that is, the exposure value EV of the image is within the exposure threshold range, it indicates that a current environment is relatively dark and the normal display of the image can be satisfied only with a relatively large exposure value EV. In conjunction with the mean brightness value Mean Luma of the image, when the number of the consecutive image frames where the mean brightness value Mean Luma of the image is within the mean brightness threshold range and the exposure value EV of the image is within the exposure threshold range is greater than or equal to the frame number threshold, it indicates that the environment is relatively dark continuously and the working mode of the day and night filter switcher may be switched from the day mode to the night mode.

In the night mode, when the exposure value EV of the image is less than or equal to the exposure threshold, that is, the exposure value EV of the image is within the exposure threshold range, it indicates that the current environment is relatively bright and the normal display of the image can be satisfied simply with a relatively small exposure value EV. In conjunction with the mean brightness value Mean Luma of the image, when the number of the consecutive image frames where the mean brightness value Mean Luma of the image is within the mean brightness threshold range and the exposure value EV of the image is within the exposure threshold range is greater than or equal to the frame number threshold, it indicates that the environment is relatively bright continuously and the working mode of the day and night filter switcher may be switched from the night mode to the day mode.

The exposure threshold and the exposure threshold range for the image are also related to the bright area proportion bright_tone_percent. The higher bright area proportion bright_tone_percent of the image indicates that the current environment has higher brightness and it is easier to be in the day mode. In this case, the exposure threshold is relatively large, the exposure threshold range in the day mode is reduced, the day mode is difficult to switch to the night mode, the exposure threshold range in the night mode is increased, and the night mode is easy to switch to the day mode. The lower bright area proportion bright_tone_percent of the image indicates that the current environment has lower brightness and it is easier to be in the night mode. In this case, the exposure threshold is relatively small, the exposure threshold range in the day mode is increased, the day mode is easy to switch to the night mode, the exposure threshold range in the night mode is reduced, and the night mode is difficult to switch to the day mode.

In the embodiment of the present disclosure, the exposure threshold and the exposure threshold range for the image are determined according to the bright area proportion bright_tone_percent of the image so that in a dynamic scene, the basic condition for switching the working mode can be adjusted according to the bright area proportion bright_tone_percent of the image of the current environment, and the number of the consecutive image frames where the mean brightness value Mean Luma of the image is within the mean brightness threshold range and the exposure value EV of the image is within the exposure threshold range is counted and the working mode is switched in the case where the number of image frames is greater than or equal to the frame number threshold so that the contents of the basic condition for switching the working mode can be increased and the working mode can be switched only when the contents of the basic condition are continuously satisfied at the same time, avoiding false triggering and further improving the switching accuracy and reliability of the day and night filter switcher.

Optionally, in the case where the first working mode is the day mode, the exposure threshold is a first exposure threshold Day2Night_Final_EV_thresh; and in the case where the first working mode is the night mode, the exposure threshold is a second exposure threshold Night2Day_Final_EV_thresh.

The first exposure threshold Day2Night_Final_EV_thresh is Day2Night_Final_EV_thresh=Day2Night_EV_thresh×(1+bright_tone_percent), where Day2Night_EV_thresh is a first preset exposure value.

The second exposure threshold Night2Day_Final_EV_thresh is Night2Day_Final_EV_thresh=Night2Day_EV_thresh×(1+bright_tone_percent), where Night2Day_EV_thresh is a second preset exposure value.

Specifically, the first exposure threshold Day2Night_Final_EV_thresh and the second exposure threshold Night2Day_Final_EV_thresh are both positively correlated to the bright area proportion bright_tone_percent of the image and increase as the bright area proportion bright_tone_percent of the image increases.

For example, in the case where the first mode is the day mode, the exposure threshold range is being greater than or equal to the first exposure threshold Day2Night_Final_EV_thresh. An increase of the bright area proportion bright_tone_percent of the image results in an increase of the first exposure threshold Day2Night_Final_EV_thresh, the exposure threshold range is reduced, and the day mode is difficult to switch to the night mode; and in the case where the first mode is the night mode, the exposure threshold range is being less than or equal to the second exposure threshold Night2Day_Final_EV_thresh. An increase of the bright area proportion bright_tone_percent of the image results in an increase of the second exposure threshold Night2Day_Final_EV_thresh, the exposure threshold range is increased, and the night mode is easy to switch to the day mode. The first preset exposure value Day2Night_EV_thresh and the second preset exposure value Night2Day_EV_thresh may be set according to actual requirements, and the size relationship between the two values is not limited in the embodiment of the present disclosure.

Thus, the exposure threshold range in the case where the first working mode is the day mode and the exposure threshold range in the case where the first working mode is the night mode can have multiple possibilities, for example, overlap or do not overlap, through the first exposure threshold Day2Night_Final_EV_thresh and the second exposure threshold Night2Day_Final_EV_thresh so that controllability and applicability can be improved.

In an optional embodiment, the first exposure threshold Day2Night_Final_EV_thresh is greater than the second exposure threshold Night2Day_Final_EV_thresh.

For example, the first exposure threshold Day2Night_Final_EV_thresh is relatively large so that the image satisfies the basic condition relatively late in the day mode and the day mode may be switched to the night mode later. The second exposure threshold Night2Day_Final_EV_thresh is relatively small so that the image satisfies the basic condition relatively late in the night mode and the night mode may be switched to the day mode later. In this manner, the first working mode may be switched to the second working mode later so that frequent switches are avoided, which can decrease a switching frequency, reduce energy consumption, and save energy.

Embodiment Three

Figure 3:
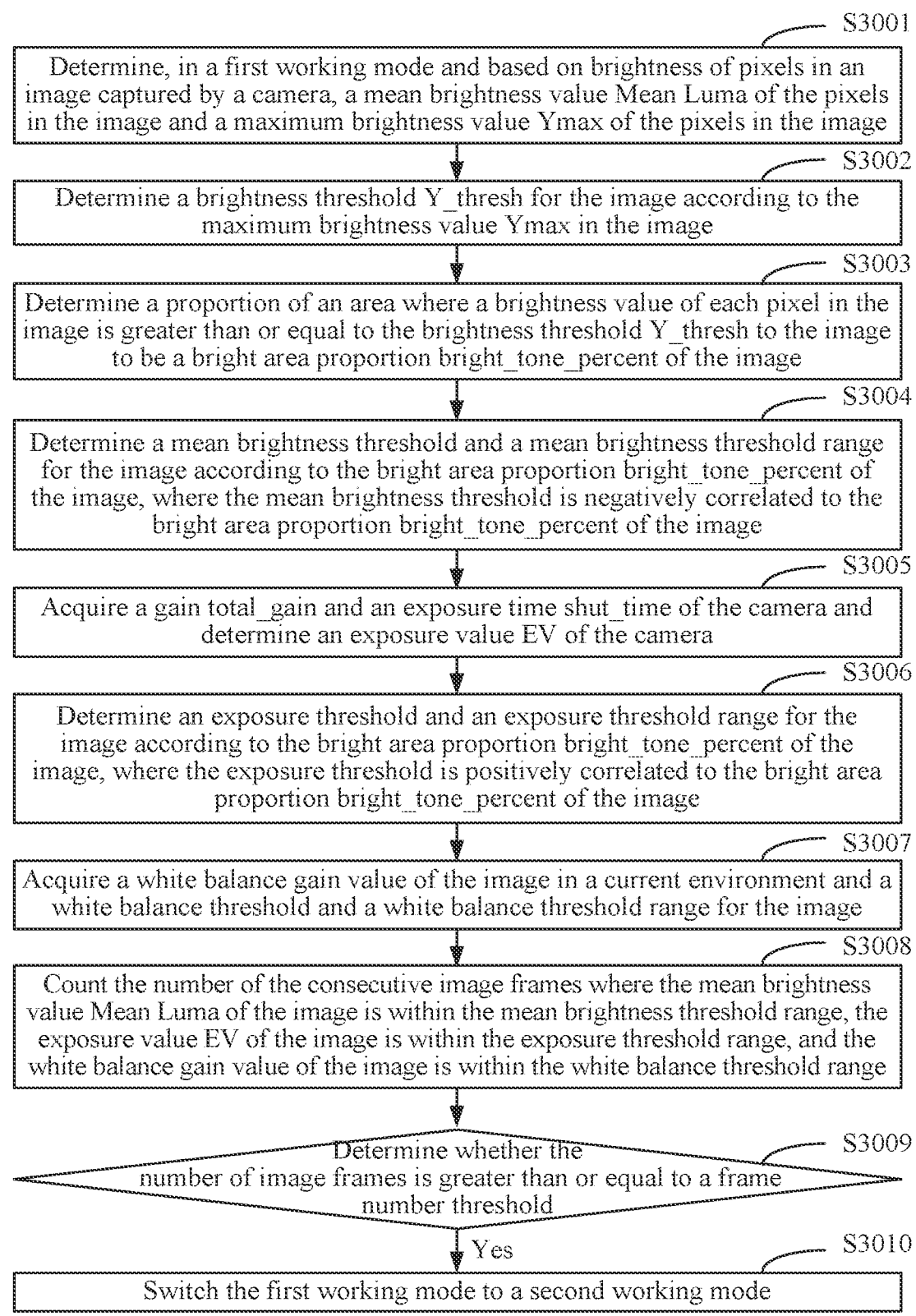
FIG. 3 is a flowchart of a switching method for a day and night filter switcher according to embodiment three of the present disclosure.

FIG. 3 is a flowchart of a switching method for a day and night filter switcher according to embodiment three of the present disclosure. Compared with the preceding embodiments, this embodiment adds a basic condition for switching a working mode: a white balance gain value of an image is within a white balance threshold range. As shown in FIG. 3, the method includes the steps described below.

In S3001, in a first working mode, based on brightness of pixels in an image captured by a camera, a mean brightness value Mean Luma of the pixels in the image and a maximum brightness value Ymax of the pixels in the image are determined.

In S3002, a brightness threshold Y_thresh for the image is determined according to the maximum brightness value Ymax in the image.

In S3003, a proportion of an area where a brightness value of each pixel in the image is greater than or equal to the brightness threshold Y_thresh to the image is determined to be a bright area proportion bright_tone_percent of the image.

In S3004, a mean brightness threshold and a mean brightness threshold range for the image are determined according to the bright area proportion bright_tone_percent of the image, where the mean brightness threshold is negatively correlated to the bright area proportion bright_tone_percent of the image.

In S3005, a gain total_gain and an exposure time shut_time of the camera are acquired and an exposure value EV of the camera is determined.

In S3006, an exposure threshold and an exposure threshold range for the image are determined according to the bright area proportion bright_tone_percent of the image, where the exposure threshold is positively correlated to the bright area proportion bright_tone_percent of the image.

In S3007, a white balance gain value of the image in a current environment and a white balance threshold and a white balance threshold range for the image are acquired.

The white balance gain value refers to gains for brightening red light, green light, and blue light of the pixels in the image to make the image visible or to enable the image to better restore original colors of an actual environment. In the case where the first working mode is a day mode, the white balance threshold range is being less than or equal to the white balance threshold; and in the case where the first working mode is a night mode, the white balance threshold range is being greater than or equal to the white balance threshold.

Optionally, the step of acquiring the white balance threshold includes: acquiring a white balance gain value in an invisible light environment; converting the white balance gain value in the invisible light environment into floating-point coordinates (x0, y0) in a two-dimensional space of a white balance algorithm; and determining the white balance threshold R0 according to the floating-point coordinates (x0, y0), where the white balance threshold $R0=(x-x0)^2+(y-y0)^2$.

For example, in the invisible light environment, in order that the image acquired by the camera can restore the original colors of the actual environment, the camera needs to perform white balance. Global statistics is performed on the white balance gain value based on a gray world algorithm and the red light, green light, and blue light are brightened by R0 gain, G0 gain, and B0 gain, respectively so that the corresponding floating-point coordinates (x0, y0) in the two-dimensional space of the white balance algorithm may be obtained, which is the white balance gain value in the invisible light environment. x0=G0/R0 and y0=G0/B0.

When the white balance gain value (x1, y1) of the image in the current environment is less than or equal to the white balance threshold R0, that is, $(x1-x0)^2+(y1-y0)^2 \leq R0$, the white balance gain value (x1, y1) of the image in the current environment approximates to the white balance gain value (x0, y0) in the invisible light environment, indicating that the current environment is relatively dark. When the white balance gain value (x1, y1) of the image in the current environment is greater than or equal to the white balance threshold R0, that is, $(x1-x0)^2+(y1-y0)^2 \geq R0$, the white balance gain value (x1, y1) of the image in the current environment is far different from the white balance gain value (x0, y0) in the invisible light environment, indicating that the current environment is relatively bright.

In S3008, the number of the consecutive image frames where the mean brightness value Mean Luma of the image is within the mean brightness threshold range, the exposure value EV of the image is within the exposure threshold range, and the white balance gain value of the image is within the white balance threshold range is counted.

In S3009, it is determined whether the number of image frames is greater than or equal to a frame number threshold. In the case where the number of image frames is greater than or equal to the frame number threshold, S3010 is performed.

In S3010, the first working mode is switched to a second working mode.

For example, the basic condition for switching the working mode further includes that the white balance gain value of the image is within the white balance threshold range. In the day mode, when the white balance gain value of the image is less than or equal to the white balance threshold, that is, the white balance gain value of the image is within the white balance threshold range, it indicates that the current environment is relatively dark. In conjunction with the mean brightness value Mean Luma and the exposure value EV of the image, when the number of the consecutive image frames where the mean brightness value Mean Luma of the image is within the mean brightness threshold range, the exposure value EV of the image is within the exposure threshold range, and the white balance gain value of the image is within the white balance threshold range is greater than or equal to the frame number threshold, it indicates that the environment is relatively dark continuously and the working mode of the day and night filter switcher may be switched from the day mode to the night mode.

In the night mode, when the white balance gain value of the image is greater than or equal to the white balance threshold, that is, the white balance gain value of the image is within the white balance threshold range, it indicates that the current environment is relatively bright. In conjunction with the mean brightness value Mean Luma and the exposure value EV of the image, when the number of the consecutive image frames where the mean brightness value Mean Luma of the image is within the mean brightness threshold range, the exposure value EV of the image is within the exposure threshold range, and the white balance gain value of the image is within the white balance threshold range is greater than or equal to the frame number threshold, it indicates that the environment is relatively bright continuously and the working mode of the day and night filter switcher may be switched from the night mode to the day mode.

In the embodiment of the present disclosure, the number of the consecutive image frames where the mean brightness value Mean Luma of the image is within the mean brightness threshold range, the exposure value EV of the image is within the exposure threshold range, and the white balance gain value of the image is within the white balance threshold range is counted and the working mode is switched in the case where the number of image frames is greater than or equal to the frame number threshold so that the contents of the basic condition for switching the working mode can be increased and the intensity of light in the current environment can be determined by white balance gains, avoiding false triggering and further improving the switching accuracy and reliability of the day and night filter switcher.

Embodiment Four

Figure 4:
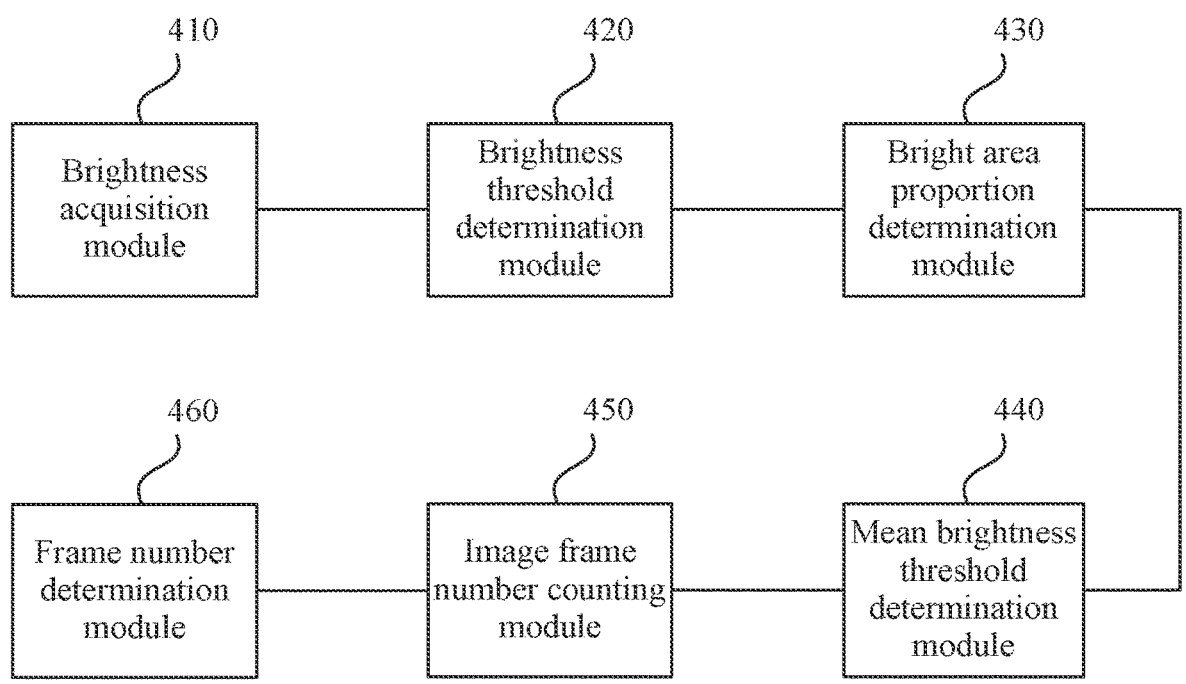
FIG. 4 is a structural diagram of a switching device for a day and night filter switcher according to embodiment four of the present disclosure.

FIG. 4 is a structural diagram of a switching device for a day and night filter switcher according to embodiment four of the present disclosure. As shown in FIG. 4, a device 40 includes a brightness acquisition module 410, a brightness threshold determination module 420, a bright area proportion determination module 430, a mean brightness threshold determination module 440, an image frame number counting module 450, and a frame number determination module 460.

The brightness acquisition module 410 is configured to determine, in a first working mode and based on brightness of pixels in an image captured by a camera, a mean brightness value Mean Luma of the pixels in the image and a maximum brightness value Ymax of the pixels in the image.

The brightness threshold determination module 420 is configured to determine a brightness threshold Y_thresh for the image according to the maximum brightness value Ymax in the image, where the brightness threshold Y_thresh=Ymax×Y_Percent, and 0<Y_Percent<1.

The bright area proportion determination module 430 is configured to determine a proportion of an area where a brightness value of each pixel in the image is greater than or equal to the brightness threshold Y_thresh to the image to be a bright area proportion bright_tone_percent of the image.

The mean brightness threshold determination module 440 is configured to determine a mean brightness threshold and a mean brightness threshold range for the image according to the bright area proportion bright_tone_percent of the image, where the mean brightness threshold is negatively correlated to the bright area proportion bright_tone_percent of the image.

The image frame number counting module 450 is configured to count a number of the consecutive image frames where the mean brightness value Mean Luma of the image is within the mean brightness threshold range.

The frame number determination module 460 is configured to determine whether the number of image frames is greater than or equal to a frame number threshold and, in the case where the number of image frames is greater than or equal to the frame number threshold, switch the first working mode to a second working mode.

In the case where the first working mode is a day mode, the second working mode is a night mode and the mean brightness threshold range is being less than or equal to the mean brightness threshold; and in the case where the first working mode is the night mode, the second working mode is the day mode and the mean brightness threshold range is being greater than or equal to the mean brightness threshold.

The switching device for the day and night filter switcher according to the embodiment of the present disclosure may perform the switching method for the day and night filter switcher according to any embodiment of the present disclosure and has function modules and beneficial effects corresponding to the method performed.

Embodiment Five

Figure 5:
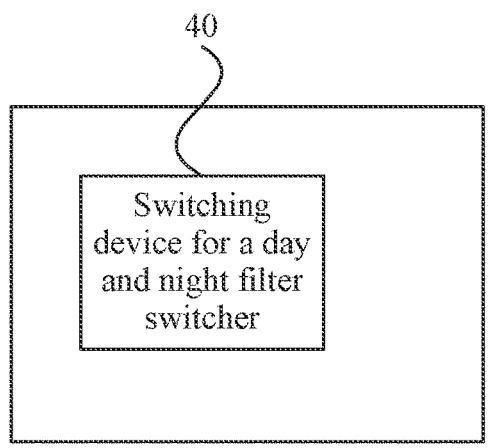
FIG. 5 is a structural diagram of a day and night filter switcher according to embodiment five of the present disclosure.

FIG. 5 is a structural diagram of a day and night filter switcher according to embodiment five of the present disclosure. As shown in FIG. 5, a day and night filter switcher 50 includes the switching device 40 for the day and night filter switcher according to any embodiment of the present disclosure.

The switching device for the day and night filter switcher in the day and night filter switcher according to the embodiment of the present disclosure may perform the switching method for the day and night filter switcher according to any embodiment of the present disclosure. Thus, the day and night filter switcher according to the embodiment of the present disclosure has function modules and beneficial effects corresponding to the method performed.

It is to be understood that various forms of the preceding flows may be used, with steps reordered, added, or removed. For example, the steps described in the present disclosure may be executed in parallel, in sequence, or in a different order as long as the desired result of the technical solutions in the present disclosure is achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modifications, equivalent substitutions, improvements, and the like made within the spirit and principle of the present disclosure fall within the scope of the present disclosure.

What is claimed is:

1. A switching method for a day and night filter switcher, comprising:
    determining, in a first working mode and based on brightness of pixels in an image captured by a camera, a mean brightness value Mean Luma of the pixels in the image and a maximum brightness value Ymax of the pixels in the image;
    determining a brightness threshold Y_thresh for the image according to the maximum brightness value Ymax in the image, wherein the brightness threshold Y_thresh=Ymax×Y_Percent, the Y_Percent is a preset percentage, and 0<Y_Percent<1;
    determining a proportion of an area where a brightness value of each pixel in the image is greater than or equal to the brightness threshold Y_thresh to the image to be a bright area proportion bright_tone_percent of the image;
    determining a mean brightness threshold and a mean brightness threshold range for the image according to the bright area proportion bright_tone_percent of the image, wherein the mean brightness threshold is negatively correlated to the bright area proportion bright_tone_percent of the image;
    counting a number of consecutive image frames where the mean brightness value Mean Luma of the image is within the mean brightness threshold range;
    determining whether the number of the consecutive image frames is greater than or equal to a frame number threshold; and
    in a case where the number of the consecutive image frames is greater than or equal to the frame number threshold, switching the first working mode to a second working mode;
    wherein in a case where the first working mode is a day mode, the second working mode is a night mode and the mean brightness threshold range is being less than or equal to the mean brightness threshold; and in a case where the first working mode is the night mode, the second working mode is the day mode and the mean brightness threshold range is being greater than or equal to the mean brightness threshold.

2. The switching method for the day and night filter switcher according to claim 1, wherein in the case where the first working mode is the day mode, the mean brightness threshold is a first mean brightness threshold Day2Night_Mean_Luma_thresh; and in the case where the first working mode is the night mode, the mean brightness threshold is a second mean brightness threshold Night2Day_Mean_Luma_thresh;
    wherein the first mean brightness threshold Day2Night_Mean_Luma_thresh is Day2Night_Mean_Luma_thresh=Day2Night_Final_Mean_Luma_thresh×(1−bright_tone_percent), wherein Day2Night_Final_Mean_Luma_thresh is a first preset mean brightness value; and
    wherein the second mean brightness threshold Night2Day_Mean_Luma_thresh is Night2Day_Mean_Luma_thresh=Night2Day_Final_Mean_Luma_thresh×(1−bright_tone_percent), wherein Night2Day_Final_Mean_Luma_thresh is a second preset mean brightness value.

3. The switching method for the day and night filter switcher according to claim 2, wherein the first mean brightness threshold Day2Night_Mean_Luma_thresh is smaller than the second mean brightness threshold Night2Day_Mean_Luma_thresh.

4. The switching method for the day and night filter switcher according to claim 1, before counting the number of the consecutive image frames where the mean brightness value Mean Luma of the image is within the mean brightness threshold range, further comprising:
    acquiring a gain total_gain and an exposure time shut_time of the camera and determining an exposure value EV of the camera;
    determining an exposure threshold and an exposure threshold range for the image according to the bright area proportion bright_tone_percent of the image, wherein the exposure threshold is positively correlated to the bright area proportion bright_tone_percent of the image;
    wherein counting the number of the consecutive image frames where the mean brightness value Mean Luma of the image is within the mean brightness threshold range comprises:
    counting a number of consecutive image frames where the mean brightness value Mean Luma of the image is within the mean brightness threshold range and the exposure value EV of the image is within the exposure threshold range;
    wherein in the case where the first working mode is the day mode, the exposure threshold range is being greater than or equal to the exposure threshold; and in the case where the first working mode is the night mode, the exposure threshold range is being less than or equal to the exposure threshold.

5. The switching method for the day and night filter switcher according to claim 4, wherein in the case where the first working mode is the day mode, the exposure threshold is a first exposure threshold Day2Night_Final_EV_thresh; and in the case where the first working mode is the night mode, the exposure threshold is a second exposure threshold Night2Day_Final_EV_thresh;
    wherein the first exposure threshold Day2Night_Final_EV_thresh is Day2Night_Final_EV_thresh=Day2Night_EV_thresh×(1+bright_tone_percent), wherein Day2Night_EV_thresh is a first preset exposure value; and
    wherein the second exposure threshold Night2Day_Final_EV_thresh is Night2Day_Final_EV_thresh=Night2Day_EV_thresh×(1+bright_tone_percent), wherein Night2Day_EV_thresh is a second preset exposure value.

6. The switching method for the day and night filter switcher according to claim 5, wherein the first exposure threshold Day2Night_Final_EV_thresh is greater than the second exposure threshold Night2Day_Final_EV_thresh.

7. The switching method for the day and night filter switcher according to claim 4, before counting the number of consecutive image frames where the mean brightness value Mean Luma of the image is within the mean brightness threshold range and the exposure value EV of the image is within the exposure threshold range, further comprising:
    acquiring a white balance gain value of the image in a current environment and a white balance threshold R0 and a white balance threshold range for the image;

wherein counting the number of the consecutive image frames where the mean brightness value Mean Luma of the image is continuously within the mean brightness threshold range and the exposure value EV of the image is continuously within the exposure threshold range comprises:

counting a number of consecutive image frames where the mean brightness value Mean Luma of the image is within the mean brightness threshold range, the exposure value EV of the image is within the exposure threshold range, and the white balance gain value of the image is within the white balance threshold range;

wherein in the case where the first working mode is the day mode, the white balance threshold range is being less than or equal to the white balance threshold R0; and in the case where the first working mode is the night mode, the white balance threshold range is being greater than or equal to the white balance threshold R0.

8. The switching method for the day and night filter switcher according to claim 1, wherein in the case where the first working mode is the day mode, switching the first working mode to the second working mode comprises:

switching a working state of the camera from the day mode to the night mode, switching to an infrared (IR) filter, and turning on an IR lamp; and wherein in the case where the first working mode is the night mode, switching the first working mode to the second working mode comprises:

switching the working state of the camera from the night mode to the day mode, switching to an all-pass filter, and turning off the IR lamp.

9. A switching device for a day and night filter switcher, comprising:

a brightness acquisition module, which is configured to determine, in a first working mode and based on brightness of pixels in an image captured by a camera, a mean brightness value Mean Luma of the pixels in the image and a maximum brightness value Ymax of the pixels in the image;

a brightness threshold determination module, which is configured to determine a brightness threshold Y_thresh for the image according to the maximum brightness value Ymax in the image, wherein the brightness threshold Y_thresh=Ymax×Y_Percent, the Y Percent is a preset percentage, and 0<Y_Percent<1;

a bright area proportion determination module, which is configured to determine a proportion of an area where a brightness value of each pixel in the image is greater than or equal to the brightness threshold Y_thresh to the image to be a bright area proportion bright_tone_percent of the image;

a mean brightness threshold determination module, which is configured to determine a mean brightness threshold and a mean brightness threshold range for the image according to the bright area proportion bright_tone_percent of the image, wherein the mean brightness threshold is negatively correlated to the bright area proportion bright_tone_percent of the image;

an image frame number counting module, which is configured to count a number of consecutive image frames where the mean brightness value Mean Luma of the image is within the mean brightness threshold range;

a frame number determination module, which is configured to determine whether the number of the consecutive image frames is greater than or equal to a frame number threshold and, in a case where the number of the consecutive image frames is greater than or equal to the frame number threshold, switch the first working mode to a second working mode;

wherein in a case where the first working mode is a day mode, the second working mode is a night mode and the mean brightness threshold range is being less than or equal to the mean brightness threshold; and in a case where the first working mode is the night mode, the second working mode is the day mode and the mean brightness threshold range is being greater than or equal to the mean brightness threshold.

10. The switching device for the day and night filter switcher according to claim 9, wherein in the case where the first working mode is the day mode, the mean brightness threshold is a first mean brightness threshold Day2Night_Mean_Luma_thresh; and in the case where the first working mode is the night mode, the mean brightness threshold is a second mean brightness threshold Night2Day_Mean_Luma_thresh;

wherein the first mean brightness threshold Day2Night_Mean_Luma_thresh is Day2Night_Mean_Luma_thresh=Day2Night_Final_Mean_Luma_thresh×(1−bright_tone_percent), wherein Day2Night_Final_Mean_Luma_thresh is a first preset mean brightness value; and wherein the second mean brightness threshold Night2Day_Mean_Luma_thresh is Night2Day_Mean_Luma_thresh=Night2Day_Final_Mean_Luma_thresh×(1×bright_tone_percent), wherein Night2Day_Final_Mean_Luma_thresh is a second preset mean brightness value.

11. The switching device for the day and night filter switcher according to claim 10, wherein the first mean brightness threshold Day2Night_Mean_Luma_thresh is smaller than the second mean brightness threshold Night2Day_Mean_Luma_thresh.

12. The switching device for the day and night filter switcher according to claim 9, wherein the image frame number counting module is further configured to perform the following steps before counting the number of the consecutive image frames where the mean brightness value Mean Luma of the image is within the mean brightness threshold range:

acquiring a gain total_gain and an exposure time shut_time of the camera and determining an exposure value EV of the camera; and determining an exposure threshold and an exposure threshold range for the image according to the bright area proportion bright_tone_percent of the image, wherein the exposure threshold is positively correlated to the bright area proportion bright_tone_percent of the image;

wherein counting the number of the consecutive image frames where the mean brightness value Mean Luma of the image is within the mean brightness threshold range comprises:

counting a number of consecutive image frames where the mean brightness value Mean Luma of the image is within the mean brightness threshold range and the exposure value EV of the image is within the exposure threshold range; and wherein in the case where the first working mode is the day mode, the exposure threshold range is being greater than or equal to the exposure threshold; and in the case where the first working mode is the night mode, the exposure threshold range is being less than or equal to the exposure threshold.

13. The switching device for the day and night filter switcher according to claim 12, wherein in the case where the first working mode is the day mode, the exposure threshold is a first exposure threshold Day2Night_Final_EV_thresh; and in the case where the first working mode is the night mode, the exposure threshold is a second exposure threshold Night2Day_Final_EV_thresh;

wherein the first exposure threshold Day2Night_Final_EV_thresh is Day2Night_Final_EV_thresh=Day2Night_EV_thresh×(1+bright_tone_percent), wherein Day2Night_EV_thresh is a first preset exposure value; and wherein the second exposure threshold Night2Day_Final_EV_thresh is Night2Day_Final_EV_thresh=Night2Day_EV_thresh×(1+bright_tone_percent), wherein Night2Day_EV_thresh is a second preset exposure value.

14. The switching device for the day and night filter switcher according to claim 13, wherein the first exposure threshold Day2Night_Final_EV_thresh is greater than the second exposure threshold Night2Day_Final_EV_thresh.

15. The switching device for the day and night filter switcher according to claim 12, wherein the image frame number counting module is further configured to perform the following steps before counting the number of consecutive image frames where the mean brightness value Mean Luma of the image is within the mean brightness threshold range and the exposure value EV of the image is within the exposure threshold range:

acquiring a white balance gain value of the image in a current environment and a white balance threshold R0 and a white balance threshold range for the image;

wherein counting the number of the consecutive image frames where the mean brightness value Mean Luma of the image is continuously within the mean brightness threshold range and the exposure value EV of the image is continuously within the exposure threshold range comprises:

counting a number of consecutive image frames where the mean brightness value Mean Luma of the image is within the mean brightness threshold range, the exposure value EV of the image is within the exposure threshold range, and the white balance gain value of the image is within the white balance threshold range;

wherein in the case where the first working mode is the day mode, the white balance threshold range is being less than or equal to the white balance threshold R0; and in the case where the first working mode is the night mode, the white balance threshold range is being greater than or equal to the white balance threshold R0.

16. The switching device for the day and night filter switcher according to claim 9, wherein the frame number determination module is further configured to perform, in the case where the first working mode is the day mode, a step of switching the first working mode to the second working mode, wherein the step comprises:

switching a working state of the camera from the day mode to the night mode, switching to an infrared (IR) filter, and turning on an IR lamp; and wherein the frame number determination module is further configured to perform, in the case where the first working mode is the night mode, the step of switching the first working mode to the second working mode, wherein the step comprises:

switching the working state of the camera from the night mode to the day mode, switching to an all-pass filter, and turning off the IR lamp.

\* \* \* \* \*